United States Patent
Seo et al.

(10) Patent No.: US 12,042,814 B2
(45) Date of Patent: Jul. 23, 2024

(54) GRAVURE COATER TEST APPARATUS AND GRAVURE COATER

(71) Applicant: LG Chem, Ltd., Seoul (KR)

(72) Inventors: Sungjong Seo, Daejeon (KR); Keu Yeun Park, Daejeon (KR); Seung Hun Yang, Daejeon (KR); Seungmo Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 17/917,099

(22) PCT Filed: Apr. 6, 2021

(86) PCT No.: PCT/KR2021/004255
§ 371 (c)(1),
(2) Date: Oct. 5, 2022

(87) PCT Pub. No.: WO2021/206407
PCT Pub. Date: Oct. 14, 2021

(65) Prior Publication Data
US 2023/0149971 A1  May 18, 2023

(30) Foreign Application Priority Data
Apr. 7, 2020 (KR) ............. 10-2020-0042334

(51) Int. Cl.
*B05C 11/10* (2006.01)
*B05C 1/08* (2006.01)
(Continued)

(52) U.S. Cl.
CPC ........ *B05C 11/1005* (2013.01); *B05C 1/0813* (2013.01); *B05C 1/0817* (2013.01);
(Continued)

(58) Field of Classification Search
CPC . B05C 11/1005; B05C 1/0813; B05C 1/0817; B05C 1/0865; G01N 21/35; G01N 21/8422; G01N 2021/8427
(Continued)

(56) References Cited

U.S. PATENT DOCUMENTS 4,615,295 A * 10/1986 Wittkopf ................ B41F 31/20
                                              118/212
4,704,296 A * 11/1987 Leanna .................... B41F 9/02
                                              427/9
(Continued)

FOREIGN PATENT DOCUMENTS

CN       203018281 U       6/2013
CN       207643874 U       7/2018
(Continued)

OTHER PUBLICATIONS

International Search Report for PCT/KR2021/004255 dated Jul. 22, 2021. 3 pgs.
(Continued)

*Primary Examiner* — Binu Thomas
(74) *Attorney, Agent, or Firm* — Lerner David LLP (57) ABSTRACT

A gravure coater test apparatus includes a gravure roll and a backup roll which are circumscribed to each other, a motor which drives the gravure roll partially submerged in a water-based pressure-sensitive adhesive for coating, a controller which adjusts the rotational speed of the motor, a doctor blade which is selected from a plurality of types to scrape the water-based pressure-sensitive adhesive from the surface of the gravure roll being rotated, and an infrared analyzer which allows at least one of the type of the water-based pressure-sensitive adhesive corresponding to the selected doctor blade, the uniformity of the coating
(Continued)

surface, and the amount of the coated water-based pressure-sensitive adhesive to be confirmed.

3 Claims, 4 Drawing Sheets

(51) Int. Cl.
*B41F 9/10* (2006.01)
*G01N 21/35* (2014.01)
*G01N 21/84* (2006.01)

(52) U.S. Cl.
CPC .......... *B05C 1/0865* (2013.01); *B05C 1/0895* (2013.01); *B41F 9/1072* (2013.01); *G01N 21/35* (2013.01); *G01N 21/8422* (2013.01); *B05C 1/083* (2013.01); *G01N 2021/8427* (2013.01)

(58) Field of Classification Search
USPC .......................................... 118/712, 211, 212
See application file for complete search history.

(56) References Cited

U.S. PATENT DOCUMENTS

| | | | | |
|---|---|---|---|---|
| 6,068,701 | A | * | 5/2000 | Kohler ................ B05C 1/0817 |
| | | | | 156/472 |
| 6,183,561 | B1 | * | 2/2001 | Belotserkovsky ........................... |
| | | | | G01B 11/0625 |
| | | | | 118/688 |
| 6,468,588 | B1 | | 10/2002 | Bernert et al. |
| 6,485,571 | B1 | * | 11/2002 | Graf ..................... D21G 9/0027 |
| | | | | 118/712 |
| 2011/0189378 | A1 | | 8/2011 | Moon et al. |
| 2013/0017319 | A1 | | 1/2013 | Moon et al. |

FOREIGN PATENT DOCUMENTS

| | | |
|---|---|---|
| CN | 207643875 U | 7/2018 |
| CN | 209683127 U | 11/2019 |
| JP | 2000265135 A | 9/2000 |
| JP | 2001179151 A | 7/2001 |
| JP | 2004358380 A | 12/2004 |
| JP | 3811122 B2 | 8/2006 |
| JP | 5806990 B2 | 11/2015 |
| JP | 2019116074 A | 7/2019 |
| KR | 20110090807 A | 8/2011 |
| KR | 101247978 B1 | 4/2013 |
| KR | 20160076350 A | 6/2016 |

OTHER PUBLICATIONS

Ma QuingLin ZhuBian, "Paintworks", Mar. 1996, 12 pgs.
Sinopec, "Corrosion Test Methods and Inspection Techniques", May 2007. 17 pgs.

* cited by examiner

GRAVURE COATER TEST APPARATUS AND GRAVURE COATER

CROSS-REFERENCE TO RELATED APPLICATIONS

The present application is a national phase entry under 35 U.S.C. § 371 of International Application No. PCT/KR2021/004255, filed on Apr. 6, 2021, which claims priority to Korean Patent Application No. 10-2020-0042334, filed on Apr. 7, 2020, the disclosures of which are incorporated herein by reference.

TECHNICAL FIELD

The present disclosure relates to a gravure coater test apparatus and a gravure coater. More particularly, to a gravure coater test apparatus for allowing various phenomena (e.g., oozing phenomenon and coating phenomenon) to be confirmed with respect to the gravure coater and a gravure coater to which test results are applied

BACKGROUND ART

According to an example, the gravure coater includes a pressure-sensitive adhesive tray which accommodates a pressure-sensitive adhesive that is a coating material, a gravure roll which is partially submerged in the pressure-sensitive adhesive tray (latex tray) and is rotated in a state that pattern grooves formed on the surface of the gravure roll is filled with the pressure-sensitive adhesive, and a backup roll which is circumscribed on the gravure roll and is rotated.

When a coating film is advanced between the gravure roll and the backup roll while the gravure roll and backup roll that are circumscribed are being rotated relatively to each other, the pressure-sensitive adhesive filled in the pattern grooves is transferred to one surface of the coating film.

At this time, a doctor blade is provided on one side of the gravure roll to scrape the pressure-sensitive adhesive adhered to the surface of the gravure roll except for the pressure-sensitive adhesive filled in the pattern grooves. Therefore, the pressure-sensitive adhesive filled in the pattern grooves may be coated on the coating film to a set coating amount and required coatability.

The gravure coater is high-speed coating equipment, and oozing phenomenon may occur in which a pressure-sensitive adhesive or water-based pressure-sensitive adhesive flows from the surface of the gravure roll to the side edge thereof depending on the rotational speed of the gravure roll when the gravure coater is driven at a high speed. Therefore, the coating thickness (coating amount and coatability) of the pressure-sensitive adhesive or the water-based pressure-sensitive adhesive coated on the coating film becomes non-uniform, and contraction phenomenon of the coating film may occur at both sides in the width direction.

However, it has been possible to test the coating phenomenon only in a gravure coater mass-producing products in the field in a state that there is not a method capable of verifying such problems. Therefore, it has realistically been difficult to perform various tests for the gravure coater (e.g., oozing phenomenon due to the relationship between the doctor blade and the water-based pressure-sensitive adhesive, and coating phenomenon for the coating amount and coatability of the water-based pressure-sensitive adhesive).

DISCLOSURE

Technical Problem

An aspect of the present technology is to provide a gravure coater test apparatus capable of testing various phenomena (e.g., oozing phenomenon and coating phenomenon) with respect to the gravure coater. Further, other aspect of the present technology is to provide a gravure coater applied after completing a test with the gravure coater test apparatus.

Technical Solution

A gravure coater test apparatus according to an embodiment of the present invention includes a gravure roll and a backup roll which are circumscribed to each other, a motor which drives the gravure roll partially submerged in a water-based pressure-sensitive adhesive for coating, a controller which adjusts the rotational speed of the motor, a doctor blade which is selected from a plurality of types to scrape the water-based pressure-sensitive adhesive from the surface of the gravure roll being rotated, and an infrared analyzer which allows at least one of the type of the water-based pressure-sensitive adhesive corresponding to the selected doctor blade, the uniformity of the coating surface, and the amount of the coated water-based pressure-sensitive adhesive to be confirmed.

The doctor blade may include a tip part forming a curved surface toward the rotation direction of the gravure roll.

An extension line of the lower surface of the tip part in the doctor blade and a circumscribed line of the gravure roll may form an intersection angle of 60 to 120°.

The water-based pressure-sensitive adhesive may have a viscosity of 50 to 70 cPs (centipoise, g/cm s).

A gravure coater test apparatus according to an embodiment of the present invention may further include a viscometer for measuring the viscosity of the water-based pressure-sensitive adhesive, and a moisture meter for measuring the solid content of the water-based pressure-sensitive adhesive A gravure coater according to an embodiment of the present invention includes a gravure roll and a backup roll which are circumscribed to each other, a motor which drives the gravure roll partially submerged in a water-based pressure-sensitive adhesive for coating, and a doctor blade which is selected from a plurality of types to scrape the water-based pressure-sensitive adhesive from the surface of the rotating gravure roll so that the water-based pressure-sensitive adhesive filled in the grooves of the gravure roll is gravure printed on a coating film advancing between the gravure roll and the backup roll.

Advantageous Effects

Since the gravure coater test apparatus of an embodiment controls the rotational speed of the gravure roll by adjusting the rotational speed of the motor driving the gravure roll with the controller, and can confirm at least one of the type of the coated water-based pressure-sensitive adhesive, the uniformity of the coating surface, and the amount of the coated water-based pressure-sensitive adhesive through the infrared analyzer, it enables an appropriate doctor blade to be selected from a plurality of types of doctor blades so as to correspond to the water-based pressure-sensitive adhesive.

Therefore, the gravure coater test apparatus of an embodiment can test and confirm various phenomena such as oozing phenomenon, coating phenomenon, etc. occurring when coating the water-based pressure-sensitive adhesive while changing the doctor blade and the water-based pressure-sensitive adhesive with respect to the gravure coater.

Further, the gravure coater of an embodiment may be used by applying the relationship between the test-completed doctor blade and the water-based pressure-sensitive adhesive to actual mass production after completing the test of a doctor blade through the gravure coater test apparatus. At this time, the gravure coater can be used in the production site after being manufactured larger at an appropriate ratio for mass production by applying the ratio relationship between test and mass production.

MODE FOR INVENTION

Hereinafter, embodiments of the present invention will be described in detail with reference to the accompanying drawings so that a person with ordinary skill in the art to which the present invention pertains can easily implement them. As those skilled in the art would realize, the described embodiments may be modified in various different ways, all without departing from the scope of the present invention. The drawings and description are to be regarded as illustrative in nature and not restrictive. Like reference numerals designate like elements throughout the specification.

Figure 1:
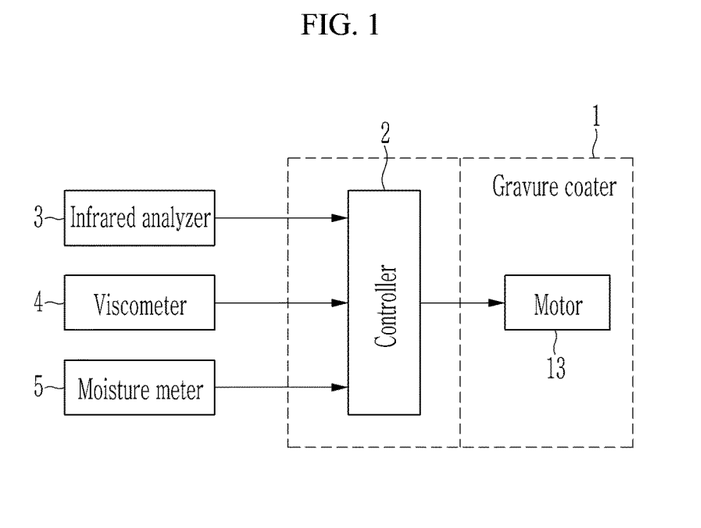
FIG. 1 is a block diagram of a gravure coater testing apparatus according to an embodiment of the present invention.

FIG. 1 is a block diagram of a gravure coater test apparatus according to an embodiment of the present invention. Referring to FIG. 1, the gravure coater test apparatus according to an embodiment includes a gravure coater 1, a controller 2, and an infrared analyzer 3. Furthermore, the gravure coater test apparatus may further include a viscometer 4 and a moisture meter 5.

Figure 2:
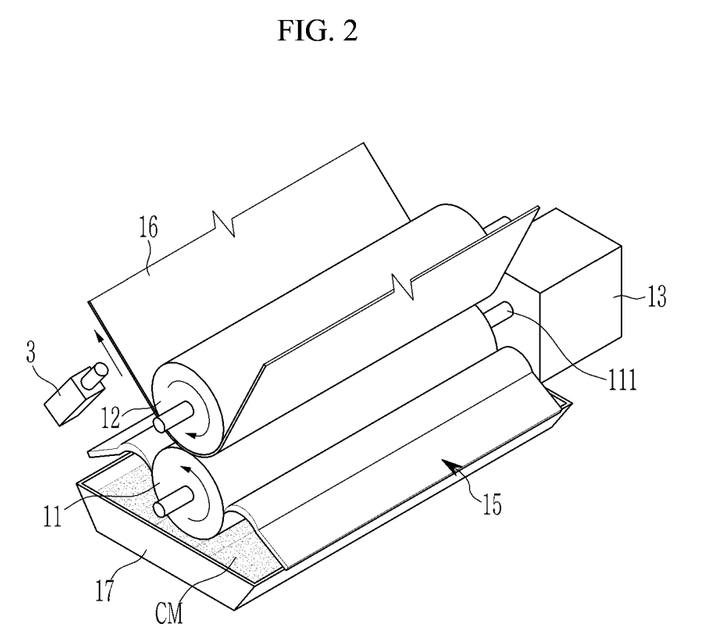
FIG. 2 is a perspective view illustrating a gravure coater test apparatus according to an embodiment of the present invention and a gravure coater.

FIG. 2 is a perspective view illustrating a gravure coater test apparatus according to an embodiment of the present invention and a gravure coater. Referring to FIGS. 1 and 2, the gravure coater 1 according to an embodiment includes a gravure roll 11, a backup roll 12, a motor 13, and a doctor blade 15.

The gravure roll 11 and the backup roll 12 are circumscribed to each other and rotationally driven, and allow coating to be performed on one side of the coating film 16 while advancing the coating film 16 through therebetween. The gravure roll 11 is provided with pattern grooves (not shown) on the surface thereof so that a coating material CM (hereinafter, referred to as an example "water-based pressure-sensitive adhesive") filled in the pattern grooves is transferred to the surface of the coating film 16.

The motor 13 is installed on a drive shaft 111 of the gravure roll 11 to perform a rotational motion of the gravure roll 11. According to the rotation of the gravure roll 11, the backup roll 12 is circumscribed with the gravure roll 11 to advance the coating film 16 while it is being rotated in the reverse direction to the rotation of the gravure roll 11.

Although not shown, the motor may be installed at the backup roll to enable the gravure roll to be rotated by rotating the backup roll.

The gravure roll 11 is rotated by the motor 13 in a state that it is partially submerged in the water-based pressure-sensitive adhesive CM for coating. The water-based pressure-sensitive adhesive CM is accommodated in the pressure-sensitive adhesive tray 17, and the gravure roll 11 is installed inside the pressure-sensitive adhesive tray 17 so that the gravure roll 11 enables its surface to be coated up with the water-based pressure-sensitive adhesive CM while being rotated.

As an example, the water-based pressure-sensitive adhesive CM may have a viscosity of 50 to 70 cPs (centipoise, g/cm s). When the viscosity is less than 50 cPs, the water-based pressure-sensitive adhesive CM is not sufficiently coated up on the gravure roll 11, but is flown down. When the viscosity is more than 70 cPs, the water-based pressure-sensitive adhesive CM may not be sufficiently transferred to the gravure roll 11 by the coating film 16.

Further, the water-based pressure-sensitive adhesive CM may be formed by adjusting the load level of latex by the rotational speed (rpm) of the gravure roll 11. That is, the water-based pressure-sensitive adhesive CM may be formed with latex being contained in order to provide stickiness.

For example, a first water-based pressure-sensitive adhesive CM1 has a viscosity of 50 to 70 cPs when measured using a viscometer 4 (62 meshes, 30 rpm), and it has a solid content of TSC 53 to 55% when measured using a moisture meter 5 (TSC).

For another example, a second water-based pressure-sensitive adhesive CM2 has a viscosity of 100 cPs when measured using a viscometer 4 (62 meshes, 30 rpm), and it has a solid content of TSC 54% when measured using a moisture meter 5 (TSC).

The doctor blade 15 may be used after being selected from a plurality of types to scrape the water-based pressure-sensitive adhesive CM from the surface of the rotating gravure roll 11. In the gravure coater test apparatus, a plurality of doctor blades 15 are provided, and may be selectively used depending on the type of the water-based pressure-sensitive adhesive CM and the coating phenomenon (i.e., the uniformity of the coating surface and the amount of the coated water-based pressure-sensitive adhesive).

Figure 3:
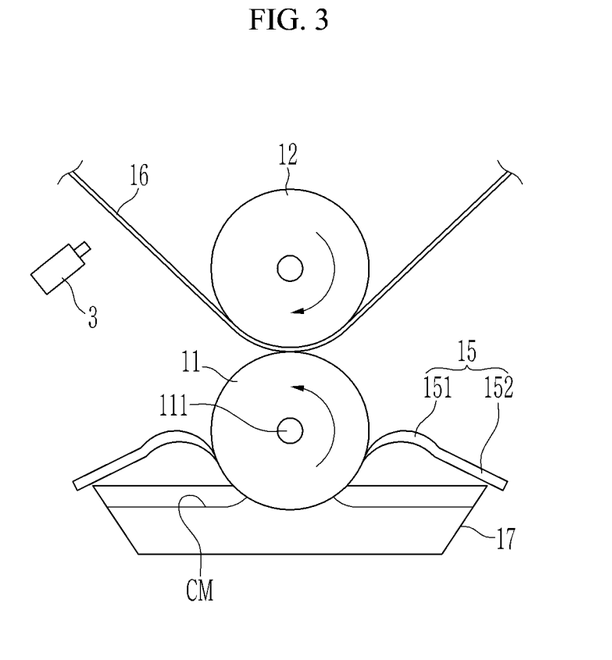
FIG. 3 is a side view of FIG. 2.

FIG. 3 is a side view of FIG. 2. Referring to FIGS. 1 to 3, the controller in the gravure coater test apparatus controls the rotational speed of the gravure roll 11 to implement a required coating speed with respect to the coating film 16.

The controller controls driving of the motor 13 in order to select the doctor blade 115 corresponding to the water-based pressure-sensitive adhesive CM. Therefore, although the controller does not mean a controller (not shown) controlling the motor 13 in the gravure coater, it may also be used in common.

In the gravure coater test apparatus, the infrared analyzer 3 enables the type of the water-based pressure-sensitive adhesive CM corresponding to the doctor blade 15 selected from the plurality of doctor blades 15, and the coating phenomenon (i.e., the uniformity of the coating surface and the amount of the coated water-based pressure-sensitive adhesive) to be confirmed.

As an example, the infrared analyzer 3 enables the coating surface to be analyzed by irradiating infrared rays toward the coating film 16 that has passed through the surface of the gravure roll 11 and receiving a signal that is returned after being reflected from the coating surface of the coating film 16.

As a result of checking the received signal of the infrared analyzer 3 in the controller, that is, the relationship between the doctor blade 15, and the type of the water-based pressure-sensitive adhesive CM and the coating phenomenon (i.e., the uniformity of the coating surface and the amount of the coated water-based pressure-sensitive adhesive) is confirmed to enable the doctor blade 15 corresponding to the water-based pressure-sensitive adhesive CM to be selected from the plurality of doctor blades 15.

In the test-completed gravure coater, a plurality of doctor blades 15 are provided, and may be actually selected and used depending on the type of the water-based pressure-sensitive adhesive CM to be used and the coating phenomenon (i.e., the uniformity of the coating surface and the amount of the coated water-based pressure-sensitive adhesive CM).

Further, the gravure coater test apparatus according to an embodiment may further include a viscometer 4 or a moisture meter 5. The viscometer 4 may measure the viscosity of a water-based pressure-sensitive adhesive CM used. The moisture meter 5 may measure the solid content in the water-based pressure-sensitive adhesive CM. That is, the solid content is for confirming the solid content finally remaining in the coating film 16 in a state that the solid content is dried after coating a solid content on the coating film 16.

Figure 4:
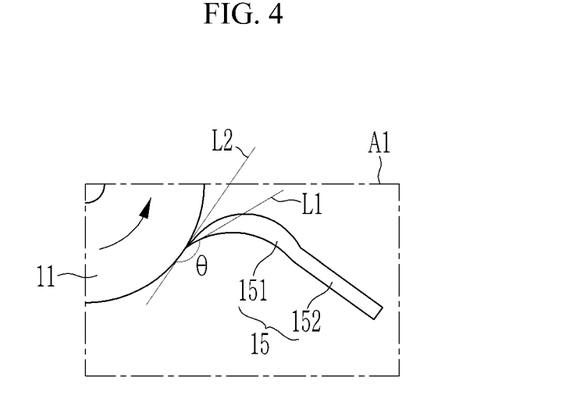
FIG. 4 is a partially enlarged view illustrating an enlarged part of a state in which the doctor blade comes in contact with the gravure roll.

FIG. 4 is a partially enlarged view illustrating an enlarged part of a state in which the doctor blade comes in contact with the gravure roll. Referring to FIGS. 2 to 4, the doctor blade 15 has an intersection angle θ.

The intersection angle θ is formed by the intersection of an extension line L1 of the lower surface of the tip part having a curved surface facing the rotation direction of the gravure roll 11 in the doctor blade 15 and a circumscribed line L2 of the gravure roll 11. The intersection angle θ may form 60 to 120°.

The intersection angle (θ) makes it possible to suppress a phenomenon that the water-based pressure-sensitive adhesive CM coated on the surface of the gravure roll 11 goes over the top of the doctor blade 15 and remains by high-speed rotation of the gravure roll in the process of scraping the water-based pressure-sensitive adhesive CM on the surface of the gravure roll 11 by the doctor blade 15. That is, the intersection angle θ suppresses the phenomenon that the water-based pressure-sensitive adhesive CM coated on a portion except for the pattern grooves is less scraped and goes over the top of the doctor blade 15 and remains on the surface of the gravure roll 11.

When the intersection angle θ is less than 60°, the doctor blade 15 cannot pressurize the surface of the gravure roll 11 and is excessively flexibly contacted therewith so that the doctor blade 15 may not be able to scrape the water-based pressure-sensitive adhesive CM on the surface of the gravure roll 11 with sufficient force. In this case, the water-based pressure-sensitive adhesive CM is less scraped and may go over the top of the doctor blade 15 and remain on the surface of the gravure roll 11.

When the intersection angle θ is more than 120°, the doctor blade 15 may not be able to make sufficient contact with the surface of the gravure roll 11 due to the tendency of the doctor blade 15 to lift from the surface of the gravure roll 11 and the water-based pressure-sensitive adhesive CM. Even in this case, the water-based pressure-sensitive adhesive CM may go over the top of the doctor blade 15 without being scraped by the doctor blade 15 and may remain on the surface of the gravure roll 11.

The intersection angle θ may be adjusted within the range of 60 to 120° by the diameter or rotational speed of the gravure roll 11 and the viscosity of the water-based pressure-sensitive adhesive CM. That is, the intersection angle θ is adjusted within the range in which the doctor blade 15 can effectively scrape a water-based pressure-sensitive adhesive CM having a viscosity by appropriately pressurizing the surface of the gravure roll 11, and it may also be adjusted depending on the material of the doctor blade 15 and the viscosity of the water-based pressure-sensitive adhesive CM.

As an example, the doctor blade 15 includes a tip part 151 which forms a curved surface forming the intersection angle θ with the gravure roll 11 and a plate-shaped installation part 152 which is connected to the tip part 151 and formed long in the longitudinal direction of the gravure roll 11.

The doctor blade 15 is disposed in a region A1 which is formed to the lower side where a horizontal line passing through the center of the gravure roll 11 and a vertical line intersect. Accordingly, the tip part 151 of the curved surface comes into contact with the gravure roll 11 at an intersection angle θ, and the installation part 152 is disposed within the region A1 which is formed to the lower side where the horizontal line and the vertical line intersect. Further, the region A1 and the doctor blade 15 disposed in the region A1 do not require an additional space required for the installation of the gravure coater 1 while implementing the effects of the present technology.

The gravure coater test apparatus is designed to be small to enable laboratory-level testing and controls the motor 13 through the controller 2, thereby enabling the rotational speed of the gravure roll 11 connected to the motor 13 to be easily adjusted.

Since the gravure coater test apparatus enables the doctor blade 15 to be easily changed, it may enable the structure of the doctor blade 15 to be applied to a water-based pressure-sensitive adhesive CM for each type of latex. In addition, the gravure coater test apparatus makes it possible to easily confirm the coating phenomenon, i.e., coatability according to the coating amount by using the infrared analyzer 3. That is, the gravure coater test apparatus enables the coating phenomenon to be easily analyzed and confirmed.

The gravure coater 1 applied to the gravure coater test apparatus is reduced and configured to ⅓ the size of an actual gravure coater applied to mass production. For example, when the diameter of the gravure roll is formed to be 60 cm in the mass production facility, the diameter of the gravure roll 11 in the present embodiment may be formed to be 20 cm.

At this time, the coating speed can be implemented three times in line with the mass production site. For example, when the coating speed in the mass production site is 160 rpm, the coating speed of the embodiment may be 480 rpm, which is three times that. The controller according to an embodiment may control the rotational speed of the gravure roll 11 to 0 to 900 rpm through the motor 13.

Meanwhile, after the gravure coater 1 according to an embodiment completes a test of the doctor blade 15 through the gravure coater test apparatus, the relationship between the test-completed doctor blade 15 and the water-based pressure-sensitive adhesive CM may be applied to and used in the actual mass production. At this time, the gravure coater 1 may be used in the production site after being manufactured larger at a ratio suitable for mass production by applying the ratio relationship between the test and mass production.

The gravure coater 1 in which the doctor blade 15 according to an embodiment was installed to an intersection angle θ of 120° ° on the gravure roll 11 and the case where the doctor blade of Comparative Example had intersection angles of 30° and 120° were compared. First and second water-based pressure-sensitive adhesives CM1 and CM2 were used.

At this time, a small amount of the oozing phenomenon occurred in Comparative Example where the gravure roll had a coating speed, i.e., a rotational speed of 400 rpm and a coating amount of 17 μm. In contrast, the oozing phenomenon did not occur in Example where the gravure roll 11 had a rotational speed of 400 rpm and a coating amount of 17 μm.

Table

Referring to Table 1, oozing phenomena were compared in unit areas (cm2) where the first and second water-based pressure-sensitive adhesives CM1 and CM2 were coated to a coating amount of 17 μm at rotational speeds of the gravure roll 11 of 300, 400, 500, and 600 rpm.

TABLE 1

| | Doctor blade | Oozing area (cm$^2$) by rotational speed (rpm) | | | | Coating phenomenon Coatability/coating |
|---|---|---|---|---|---|---|
| | blade | 300 | 400 | 500 | 600 | amount |
| First water-base pressure-sensitive adhesive | Comparative Example | 0 | 10 | 30 | 60 | uniform/17 μm |
| | Example | 0 | 0 | 10 | 20 | uniform/17 μm |
| Second water-base pressure-sensitive adhesive | Comparative Example | 0 | 15 | 40 | 60 | uniform/17 μm |
| | Example | 0 | 0 | 10 | 20 | uniform/17 μm |

The first and second water-based pressure-sensitive adhesives CM1 and CM2 were used, and the rotation speed of the gravure roll 11 was changed to 300, 400, 500, and 600 rpm so that the first and second water-based pressure-sensitive adhesives CM1 and CM2 were coated to a coating amount of 17 μm on the coating film 16.

As a whole, the coating phenomenon, that is, the coatability with respect to the coating amount, appeared uniformly. Compared to Comparative Example, the oozing phenomenon was less occurred in Example when coating at 400, 500, and 600 rpm. Therefore, Example can effectively prevent the oozing phenomenon.

It can be seen in Comparative Example compared to Example that the first and second water-based pressure-sensitive adhesives CM1 and CM2 coated on the gravure roll 11 are flown down further to the side of the gravure roll 11 as the physical bonding of latex within the first and second water-based pressure-sensitive adhesives CM1 and CM2 is lowered due to high-speed rotation of the gravure roll 11.

Although preferred embodiments of the present invention have been described above, the present invention is not limited thereto, the preferred embodiments can be implemented in various modified forms within the scope of the claims, the description of the invention, and the accompanying drawings, and it goes without saying that these various modified forms also fall within the scope of the present invention.

| (Explanation of marks) | |
|---|---|
| 1: Gravure coater | 2: Controller |
| 3: Infrared analyzer | 4: Viscometer |
| 5: Moisture meter | 11: Gravure roll |
| 12: Backup roll | 13: Motor |
| 15: Doctor blade | 16: Coating film |
| 17: Pressure-sensitive adhesive tray | 111: Drive shaft |
| 151: Tip part | 152: Installation part |
| A1: Region | |
| CM: Coating material (water-based pressure-sensitive adhesive) | |
| CM1, CM2: First and second water-based pressure-sensitive adhesives | |
| L1: Extension line | |
| L2: Circumscribed line | θ: Intersection angle |

The invention claimed is:

1. A gravure coater test apparatus comprising:
   a gravure roll and a backup roll which are circumscribed to each other;
   a motor configured to drive the gravure roll partially submerged in a water-based pressure-sensitive adhesive for coating;
   a doctor blade configured to scrape the water-based pressure-sensitive adhesive from a surface of the gravure roll as it is rotated;
   an infrared analyzer configured to allow a type of the water-based pressure-sensitive adhesive, a uniformity of the coating surface, and an amount of the coated water-based pressure-sensitive adhesive to be confirmed; and
   a controller configured to receive a signal from the infrared analyzer and adjust a rotational speed of the motor,
   wherein the doctor blade includes a tip part forming a curved surface toward a rotation direction of the gravure roll, and
   wherein
   an extension line of a lower surface of the tip part of the doctor blade and a circumscribed line of the gravure roll form an intersection angle of 60 to 120°.

2. The gravure coater test apparatus of claim 1, further comprising
   a viscometer configured to measure a viscosity of the water-based pressure-sensitive adhesive, and
   a moisture meter configured to measure a solid content of the water-based pressure-sensitive adhesive.

3. A gravure coater comprising:
   a gravure roll and a backup roll which are circumscribed to each other;
   a motor configured to drives the gravure roll partially submerged in a water-based pressure-sensitive adhesive for coating; and a doctor blade configured to scrape the water-based pressure-sensitive adhesive from a surface of the rotating gravure roll so that the water-based pressure-sensitive adhesive filled in grooves of the gravure roll is gravure printed on a coating film advancing between the gravure roll and the backup roll;

wherein the doctor blade includes a tip part forming a curved surface toward a rotation direction of the gravure roll, and wherein an extension line of a lower surface of the tip part of the doctor blade and a circumscribed line of the gravure roll form an intersection angle θ of 60 to 120°.

* * * * *